United States Patent [19]
Gandy et al.

[11] 3,772,050
[45] Nov. 13, 1973

[54] STABILIZATION OF CELLULOSE ESTER DOPES

[75] Inventors: Gerald C. Gandy; Gerald G. Reafler, both of Rochester, N.Y.

[73] Assignee: Eastman Kodak Company, Rochester, N.Y.

[22] Filed: Aug. 16, 1971

[21] Appl. No.: 172,270

Related U.S. Application Data

[63] Continuation of Ser. No. 863,355, Oct. 2, 1969, abandoned.

[52] U.S. Cl.................. 106/178, 106/14, 106/182, 106/190, 106/194, 260/45.85 B
[51] Int. Cl.. C08b 21/04, C08b 21/06, C08b 27/66
[58] Field of Search................... 106/182, 190, 194, 106/178, 14; 260/45.85 B

[56] References Cited
UNITED STATES PATENTS

| | | | |
|---|---|---|---|
| 2,439,677 | 4/1948 | Shapiro | 260/45.85 B |
| 3,168,492 | 2/1965 | Doyle et al. | 260/45.85 B |
| 3,347,689 | 10/1967 | Futami et al. | 106/194 |
| 3,438,934 | 4/1969 | Reinhardt | 260/45.85 B |
| 3,592,671 | 7/1971 | Malm et al. | 106/190 |

FOREIGN PATENTS OR APPLICATIONS

| | | | |
|---|---|---|---|
| 534,751 | 3/1941 | Great Britain | 106/182 |

*Primary Examiner*—Allan Lieberman
*Attorney*—William T. French et al.

[57] ABSTRACT

The use of a small amount of a salicylate dissolved in cellulose ester dopes has been found to result in the stabilization of such dopes to a significant extent against the undesired formation of amber or brownish-red insoluble globules in the dope.

12 Claims, No Drawings

STABILIZATION OF CELLULOSE ESTER DOPES

This is a continuation of U.S. Pat. application Ser. No. 863,355, filed Oct. 2, 1969, now abandoned.

This invention relates to the manufacture of films which consist essentially of plasticized cellulose esters. More particularly, this invention relates to a novel, valuable method for stabilizing dopes of cellulose esters against the formation of troublesome so-called "amber specks," which are insoluble materials that ordinarily appear in generally unpredictable manner in dopes containing cellulose esters dissolved in mainly organic solvent media.

Generally, in the manufacture of films of plasticized cellulose esters of lower fatty acids, the cellulose ester(s) and appropriate plasticizer(s) are formulated into "dopes" or casting solutions which comprise an essentially organic solvent medium containing dissolved therein, the essential non-volatile materials. Such dopes are filtered and then converted into films (such as, for example, transparent photographic "film bases") in casting machines in a conventional manner, including the use of hot air drying and curing at temperatures often in excess of 200°F to remove the bulk of the solvents from the films.

In practice, the essentially organic solvent casting solutions or dopes are found to contain a small amount of water (generally in the range of from about 0.1 to about 0.5 weight percent of the dope), because it is impractical to provide raw materials that are completely free of moisture. In the presence of moisture, apparently the halogenated hydrocarbon portion of the solvent medium degrades (in the additional presence of an iron-containing distribution system, such as pipes, hold tanks, pumps and the like) to form, among other things, some hydrochloric acid. This acid, in turn, reacts with the ferrous metals in the distribution system yielding various "ferric" reaction products. This ultimately causes the formation of the troublesome "amber specks" which were referred to above. Such insoluble amber or brownish-red specks are believed to develop over a period of time in portions of the system that are fairly isolated from the swifter flowing part of the dope stream (for example, in the valleys between the teeth of ferrous metal gear pumps, or at sharp bends in the pipes). These specks eventually find their way into the dope stream and ultimately through the mechanical filters and into the dope hoppers and the cast film, causing not only colored specks in the film base, but also often lodging at the lip of the hopper, thereby causing undesirable lines or irregular streaks in the resulting films, making such films unacceptable for use. From this it can be appreciated that an economical solution to this "amber speck" problem is definitely needed.

Since the use of "bone dry" raw materials is economically impractical, it would appear that a solution to this problem would be simply to add to the dope compositions a material that would react with any hydrochloric acid that forms immediately as the acid is formed. However, the simple selection of any material that reacts with HCl will not result in an acceptable solution to this problem because of several critical requirements that are placed upon the dope systems to which this invention is directed (due to the ultimate intended usage of the cellulose ester films as bases for sensitized photographic products). Thus, an acceptable "dope stabilizer" for use in these dope systems must meet the following critical requirements:

1. The material must be capable of reacting with HCl (and ultimately inhibit the formation of the troublesome "amber specks").
2. The material must be soluble at the necessary concentrations in the final dope composition.
3. The material must not react, with ferrous metals used in the dope handling equipment, excessively.
4. The material and its reaction products in the dope must not change the light transmission characteristics of the resulting films.
5. The material and its reaction products in the dope must be substantially colorless.
6. The material and its reaction products must not adversely affect the physical properties of the resulting films.
7. The material and its reaction products in the dope must be resistant to extraction from the resulting films during the application to the films of various "coating" compositions (thereby not causing the formation of any undesired precipitate from such "coating" compositions).
8. The material and its reaction products in the dope must not affect the sensitometric or aging characteristics of resulting sensitized films that are to be made from the cast and cured film base.

With all of these critical requirements in mind, it can be appreciated that to find an effective, acceptable "dope stabilizer" is an extremely difficult problem.

Thus, inorganic and organic bases represent a class of chemical materials that can be expected to react with the HCl in the various dope systems to form the necessary innocuous, stable, essentially neutral salt of this acid. However, in actual practice, the necessity to maintain an "excess" of stabilizer in the dope systems at all times makes the use of such inorganic or organic bases unacceptable, because the presence of bases in the dopes causes the cellulose esters to be saponified, thereby causing the formation of undesired insoluble materials in the dope composition and/or adversely affecting the physical properties of the resulting films. Weak bases (which would not cause the saponification of the cellulose ester) do not form sufficiently stable acid salts in the moist dope systems to prevent the existence of some free HCl in such systems. Similarly, the use of the soluble acid salt of an acid weaker than HCl apparently cannot cure this situation either, because (since the "stabilizer" material must be used in excess of the amount of HCl in the system at a given time) the strongly basic cation that would be used causes enough basicity in the moist dope systems to saponify the cellulose esters.

The possibility also existed that the "amber speck" problem might be cured by using a conventional "chelating agent" such as ethylenediamine tetraacetic acid, citric acid or tartaric acid (or their respective alkali metal salts), to thereby react with the ferric ion (that resulted from attack on the iron-containing dope handling equipment) and thereby hopefully eliminate the "amber specks." However, use of these well-known chelating agents in the acid form resulted in further acidic attack on the iron equipment, while the salt form of these materials (such as their sodium salts) is apparently not sufficiently soluble in these dope systems to be effective as "dope stabilizers." Whatever the reason, such widely used "chelating" materials as these are simply not acceptable stabilizers.

From the foregoing, it can be appreciated that the discovery of a material that (a) can effectively stabilize cellulose ester dopes containing halogenated hydrocarbon solvents against their otherwise spontaneous attack upon the iron dope distribution systems in which the dope is used; (b) that concurrently prevents the formation of the troublesome "amber specks" in the dope system; and (c) that meets all of the aforementioned critical requirements for an acceptable "dope stabilizer" an extremely difficult thing to accomplish. However, a material has now been discovered that meets all of these rigid requirements. That material is the salicylate anion, when it is present in the dopes at a concentration of at least about $1 \times 10^{-4}$ weight percent preferably from about 0.001 to about 1 weight percent of said dopes.

The particular manner the salicylate anion is introduced into the dopes of the present invention is apparently not critical, with respect to the successful practice of the invention, so long as enough salicylate anions are ultimately dissolved into the dopes. Preferably, it is simply dissolved in the remainder of the dope formulation as a soluble salicylate salt, such as sodium salicylate. The sodium salt is preferred, of all the alkali metal salts, because sodium chloride is the alkali metal chloride that is least likely to be troublesome with respect to requirement "7", above. Similarly, alkaline earth metal salicylates are less desirable than sodium salicylate for this use because of their low solubility in most of the dope formulations of this invention.

Although it is not known with certainty, the mechanism by which the preferred salicylate acts it is believed to involve two reactions: First, the salicylate cation reacts with HCl to yield an innocuous chloride salt (such as sodium chloride, in the case of sodium salicylate usage) thereby preventing the formation of amber globules; and second, the salicylate will even react with ferric chloride if some of it is present in the dope, to yield the innocuous chloride salt (such as NaCl) and a soluble iron salicylate complex. Also, even if some attack on the metal occurs due to the formation of salicylic acid in the dope, the reaction product is a soluble complex, and the undesired "amber specks" never appear.

The cellulose ester dope formulations about which the present invention is concerned contain, dissolved in the organic solvent medium, at least one (and sometimes more than one) cellulose ester of a lower fatty acid (2-4 carbon atoms/acid molecule) such as cellulose acetate, cellulose propionate, cellulose butyrate, cellulose acetate propionate, cellulose acetate butyrate, and the like. When cellulose acetate is the ester being used, those having acetyl contents of from about 42 to about 44 percent are preferred. Similarly, when cellulose acetate propionate is used, those having acetyl contents of from about 29 to about 31 percent and propionyl contents of from about 13 to about 15 percent are preferred. Also, when cellulose acetate butyrate is used, those having from about 30 percent and a butyryl content of from about 15 to about 40 percent are preferred. The organic solvent medium fraction of the stabilized dopes of this invention contain from about 40 to about 95 weight percent of organic solvents, at least about 5 weight percent thereof being one (or a mixture of) chlorinated hydrocarbons having boiling points below about 100°C. The preferred chlorinated hydrocarbon is methylene chloride, and preferred usage thereof is at a level of from about 70 to about 95 weight percent of the organic solvent fraction. Other components, such as methyl alcohol, acetone, cyclohexane and butyl alcohol can also be present in the organic solvent medium, along with the chlorinated hydrocarbon(s).

In the processes now being employed in the trade for making cellulose ester sheeting, flowable dopes are formulated by dissolving the cellulose ester in a suitable solvent and adding a plasticizer thereto. In some cases, as for instance in the preparation of filaments, plasticizer is omitted. Other additives such as pigments, etc. may be used as desired or required for the particular dope which is sought.

Since those ordinarily skilled in the preparation of cellulose ester dopes are well aware of the wide variation in types of organic solvents that can be utilized in the various dope formulations to achieve various desired effects, there is no need to described in detail herein such organic solvents or the specific reasons for their presence in the various formulations. It is believed sufficient to point out that in all of the dope formulations to which the present invention relates, a chlorinated hydrocarbon having a boiling point of at most about 100°C (such as, for example, methylene chloride) is present in the solvent portion of the cellulose ester dopes as a significant component (i.e., at least about 5 weight percent). However, considering only the solvent portion of the dopes of the invention, it is preferred that at least about 30 weight percent thereof be one (or a mixture) of the chlorinated hydrocarbons. The solvent portion of the cellulose ester dope formulations of the present invention preferably constitutes from about 65 weight percent to about 95 weight percent of the total formulation, and preferably comprises from about 75 to about 85 weight percent thereof. The remainder of the dope formulation consists of materials that are essentially non-volatile at 105°C, such as the cellulose esters, plasticizers, pigments, dyes, various stabilizers selected to improve the aging characteristics of the solid cellulose ester coating compositions after the solvents have been evaporated, as well as other non-volatile materials. (At this point it should be noted that the present invention is directed to "stabilizers" for the "dope" systems, which differ markedly both in purpose and action mechanism from materials that improve the aging characteristics of the "dried" films.)

In the following examples, all parts are by weight unless otherwise specified.

EXAMPLE I

A large "stock solution" of a conventional cellulose acetate dope is prepared by blending together for 6 hours 100 parts of cellulose acetate (having an acetyl content of 43 percent), 12 parts of triphenyl phosphate, 6 parts of dimethoxyethyl phthalate, 750 parts of methylene chloride, 50 parts of methyl alcohol and 60 parts of butyl alcohol. The moisture content of the resulting dope is then adjusted to 0.5 weight percent. This stock solution is then divided into eight equal parts and each placed in a separate clean glass container. Into each container (except one "control" or "blank") is then added enough sodium salicylate to yield concentrations ranging from $1 \times 10^{-4}$ to $1 \times 10^{-2}$ weight percent of sodium salicylate, based on the total weight of the dope. Each is stirred until the salicylate is dissolved. These dopes are then tested for their corrosivity as follows:

Into each container is inserted a ½ × 6 inches cleaned, degreased tool steel rod. The material in the container just covers half the rod. The container is then tightly capped, inverted, and placed in a 95°F oven for from 4 to 9 days. At the specified time, the amount of amber material adhering is determined by microscopically examining the rod. The dope is then assigned a "rating" of from 0 (which represents complete freedom from amber specks) to 10 (which represents a gross amount of amber specks). Similarly, after removing the dried dope from the rods, the rods are examined microscopically for corrosion, and rated from 0 to 10 according to the relative amount of corrosion observed ("0" representing essentially no rod corrosion).

TABLE I

| Weight percent sodium salicylate based on dope | Formation of amber material | | | Rod corrosion | | |
|---|---|---|---|---|---|---|
| | 4 days | 6 days | 9 days | 4 days | 6 days | 9 days |
| 0 (control) | 6 | 6 | 8 | 8 | 5 | 8 |
| 0.0001 | | 2 | | | | |
| 0.0005 | | 1 | | | | |
| 0.001 | 1 | 1 | 2 | 1 | 1 | 1 |
| 0.0025 | 1 | | 1 | 1 | | 1 |
| 0.005 | 1 | 1 | 1 | 1 | 0 | 1 |
| 0.0075 | 1 | | 1 | 1 | | 1 |
| 0.01 | 1 | 1 | 1 | 1 | 0 | 1 |

EXAMPLE II

Two solutions of recovered film scrap (essentially 87 percent cellulose triacetate of 43.4 percent acetyl content, 8.5 percent triphenyl phosphate, and 4.5 percent dimethoxyethyl phthalate) are made by dissolving the scrap film in a solvent mixture consisting of 90 percent methylene chloride and 10 percent of a mixture of equal parts of methyl alcohol and butyl alcohol to make a clear viscous solution. Sodium salicylate (0.01 percent based on the weight of the solution) is dissolved into one of the solutions.

Specially prepared corrosion test strips of steel are partially immersed in each solution. After holding these solutions for 7 days at 205°F in an autoclave, the test strip in the solution without dissolved salicylate shows a reddish gelatinous material adhering to the steel strip surface which is insoluble in the methylene chloride-alcohol solution. When the steel test strip which had been placed in the dope without salicylate is thoroughly cleaned, it shows a severe surface etch and fairly large weight loss.

The solution containing sodium salicylate does not contain any color or gelatinous material adhering to the surface of the steel strip. The steel speciment does not show a corrosion on its surface, and the weight loss is very little.

EXAMPLE III

Two solutions of cellulose triacetate of 43.4 percent acetyl content are made by dissolving the cellulose triacetate in a solvent mixture consisting of 84 percent methylene chloride and 16 percent of equal parts of methyl alcohol and cyclohexane. 15 percent (based on the weight of the cellulose triacetate) of triphenyl phosphate plasticizer is added to those solutions. Sodium salicylate 0.005 percent based on the total weight of the dope solution) is dissolved into one of the solutions.

Specially prepared corrosion test strips of steel are partially immersed in each solution. After holding the strips in these solutions for seven days at 205°F in an autoclave, the test strip in the solution without dissolved salicylate is found to have an adhering reddish-yellow gelatinous material which is insoluble in the solvent used in dissolving the cellulose triacetate. When this steel test strip is thoroughly cleaned, it showed severe surface "pitting."

The solution containing dissolved salicylate does not contain any color or gelatinous material adhering to the steel strip surface. This steel strip also does not show any corrosion on its surface.

EXAMPLE IV

Two dopes containing 24 parts cellulose acetate butyrate (containing 30 percent acetyl and 18 percent butyryl), 50 parts of ethylene dichloride, 15 parts of cyclohexane, 10 parts of butyl alcohol, 2 parts of triphenyl phosphate plasticizer and 0.2 parts of water are prepared. Into one is dissolved 0.005 weight percent of salicylic acid. The corrosion test described in Example II results in similar excellent inhibition of the undesired "amber specks" by the presence of dissolved salicylate anions as compared with the control, and improved corrosion inhibition also is found to result from the presence of dissolved salicylate anions (although, in this case, the iron was somewhat more corroded than when a salt of salicylic acid is used.

Preferred usage for several of the commonly used plasticizers can be set out. Thus, when triphenyl phosphate is the only plasticizer present, it is preferred that it be present in an amount equal to from about 12 to about 20 weight percent, based on the weight of cellulose ester in the dope. When used in admixture with at least one other plasticizer, it preferably should be present, on the same basis, at from about 5 to about 15 weight percent, while the other plasticizer(s) should preferably be present at a level of from about 2 to about 10 weight percent.

The solutions containing dissolved salicylate from each of the examples, when employed in coating out film base or sheeting by conventional procedure from a hopper onto a film-forming surface, shows the formation of essentially no defects, as might result from the presence of insoluble globules. The sheeting obtained in each case is of good clarity and free of any discoloration, as might be encountered from the presence of large amounts of iron salts in the coating dope. Extended usage of sodium salicylate in commercial production of photographic films of cellulose acetate confirms the foregoing excellent laboratory results. Tests show that the presence of residual salicylate in photographic film base at the levels used in this invention has no detrimental effect on such product.

Although our invention has been described in considerable detail with reference to certain preferred embodiments thereof, it will be understood that variations and modifications can be effected within the spirit and scope of the invention as described hereinabove and as defined in the appended claims.

What is claimed is:

1. A process for preventing the formation of insoluble amber specks in a cellulose ester dope; said cellulose ester dope comprising a lower fatty acid ester of cellulose dissolved in a solvent medium which consists essentially of organic solvents and constituting from about 40 to about 95 weight percent of said dope; at least about 5 weight percent of said solvent medium being one or more chlorinated hydrocarbons having boiling points below about 100°C, at least about 0.1 weight percent of water being present in said dope, and each fatty acid portion of said lower fatty acid ester of cellulose containing from 1 to 4 carbon atoms; said process comprising the step of incorporating into said dope an amount of a salicylate material selected from the group consisting of salicylic acid and alkali metal salts thereof to provide from at least about $1 \times 10^{-4}$ to about 1 weight percent of dissolved salicylate anions in said dope.

2. A process as in claim 1 wherein said chlorinated hydrocarbon is methylene chloride.

3. A process as in claim 1, wherein said chlorinated hydrocarbons constitute at least about 50 weight percent of said solvent medium.

4. A process as in claim 1, wherein said amount of said salicylate material is calculated to provide from about 0.001 to about 1 weight percent of salicylate anion in said dope.

5. A process as in claim 4, wherein said salicylate anion is introduced into said solvent medium in the form of sodium salicylate.

6. A process as in claim 4, wherein said lower fatty acid ester of cellulose is selected from the group consisting of cellulose acetate, cellulose acetate butyrate, cellulose butyrate, cellulose acetate propionate, cellulose propionate and mixtures thereof.

7. A process as in claim 4 wherein said lower fatty acid ester of cellulose is cellulose acetate.

8. A process as in claim 4, wherein said lower fatty acid ester of cellulose is cellulose acetate butyrate.

9. A process as in claim 4, wherein said lower fatty acid ester of cellulose is cellulose propionate.

10. A process as in claim 4, wherein said salicylate anion is introduced into said solvent medium in the form of salicylic acid.

11. A process as claim 1 wherein said solvent medium includes butyl alcohol.

12. A process as in claim 3 wherein the solvent medium includes at least one organic solvent selected from methyl alcohol, acetone, cyclohexane, and butyl alcohol.

* * * * *